United States Patent [19]

Hirano

[11] Patent Number: 4,980,847

[45] Date of Patent: Dec. 25, 1990

[54] TEMPERATURE MEASURING DEVICE

[75] Inventor: Masao Hirano, Takatsuki, Japan

[73] Assignee: Omron Tateisi Electronics Co., Kyoto, Japan

[21] Appl. No.: 709,395

[22] Filed: Mar. 7, 1985

[30] Foreign Application Priority Data

Mar. 7, 1984 [JP]  Japan .................. 59-43520

[51] Int. Cl.⁵ .............. G01J 5/60; G06F 15/20
[52] U.S. Cl. ............... 364/557; 364/571.03; 250/339; 356/45; 374/127
[58] Field of Search ........... 364/525, 557, 571.03; 374/127, 171, 159; 356/43, 45, 50; 250/339

[56] References Cited

U.S. PATENT DOCUMENTS

| | | | |
|---|---|---|---|
| 3,795,918 | 3/1974 | Sunderland | 374/127 X |
| 4,075,493 | 2/1978 | Wickersheim | 374/159 |
| 4,215,275 | 7/1980 | Wickersheim | 374/159 X |
| 4,303,984 | 12/1981 | Houvig | 374/171 X |
| 4,345,840 | 8/1982 | Goetz et al. | 250/339 X |
| 4,413,324 | 11/1983 | Tatsuwaki et al. | 356/45 X |
| 4,433,232 | 2/1984 | Tachikawa et al. | 356/43 X |
| 4,462,699 | 7/1984 | Shaw et al. | 356/43 X |
| 4,547,774 | 10/1985 | Gould | 455/610 |
| 4,561,789 | 12/1985 | Anderson | 250/339 X |
| 4,576,486 | 3/1986 | Dils | 250/339 X |
| 4,594,510 | 6/1986 | Brown et al. | 250/339 |
| 4,679,157 | 7/1987 | Hirano et al. | 374/159 X |
| 4,692,875 | 9/1987 | Riley | 364/497 |

FOREIGN PATENT DOCUMENTS 0139038  8/1983  Japan ................ 374/127

OTHER PUBLICATIONS

English translation of Hirano JP. 58-139038 (1983).

Primary Examiner—Joseph L. Dixon
Attorney, Agent, or Firm—Dickstein, Shapiro & Morin

[57] ABSTRACT

A temperature measuring device is disclosed which comprises a light source for emitting light the spectrums of which are constant with respect to time, a photoelectric transducer for sensing the emitted light with a plurality of predetermined different wavelengths to generate electrical outputs for each wavelength, and a microcomputer for computing a ratio based on the outputs generated from the transducer and for generating an output signal representing temperature corresponding to the ratio.

15 Claims, 7 Drawing Sheets

TEMPERATURE MEASURING DEVICE

BACKGROUND OF THE INVENTION

This invention relates to a temperature measuring device, and more particularly, to an improved temperature measuring device employing a sensor which is exposed to an environment such as ambient air or to an object to be measured and which generates an electric signal representing the temperature of the environment or object. A temperature measuring device employing a thermistor which generates electric signals in proportion to temperature of an object is well known. Such a device is relatively inaccurate because the temperature characteristic of the thermistor is nonlinear and the thermistor itself cannot provide an accurate output signal over a wide temperature range.

It is, therefore, a primary object of this invention to provide an accurate temperature measuring device which measures the temperature of a semiconductor photoelectric transducer itself in accordance with the principle that the photoelectric conversion efficiency of the transducer varies with temperature and that the temperature coefficient of the photoelectric conversion efficiency varies with the wavelength or the spectrum component of received light from a light source. The photoelectric transducer can be placed to be affected by ambient temperature or temperature of an object and thus act as a temperature measuring device.

It is a further object of this invention to provide a temperature measuring device which generates output signals representing temperature corresponding to ratios based on the outputs generated from a semiconductor photoelectric transducer for different wavelength regions.

It is still another object of this invention to provide a temperature measuring device which employs a light emitting means for emitting light to the transducer, the spectrums of which are constant with respect to time.

According to this invention, there is provided a semiconductor photoelectric transducer which operates in response to a particular wavelength or a particular spectrum component of light received by the transducer so that its outputs are free from the undesirable effect caused by the fact that the temperature coefficient of the photoelectric conversion efficiency varies with the wavelength or the spectrum component of received light. Therefore, output signals representing temperature can be obtained by placing the semiconductor photoelectric transducer in a temperature measuring environment and computing the ratio based on the outputs generated from the semiconductor photoelectric transducer. Furthermore, when employing the semiconductor photoelectric transducer as a light receiving element in optical measuring, a temperature compensation value can be obtained from its outputs, thus considerably improving the measuring accuracy.

DETAILED DESCRIPTION OF THE PREFERRED EMBODIMENTS

Figure 1A:
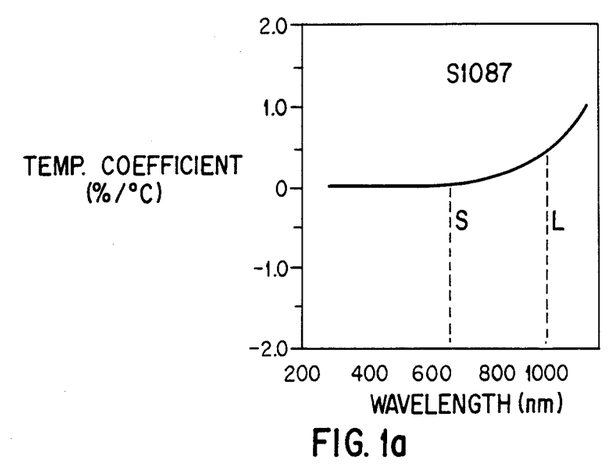
FIGS. 1a and 1b are graphs showing a relation between a series of wavelength and temperature coefficients of photoelectric conversion efficiency for different semiconductor photodiodes.
Figure 1B:
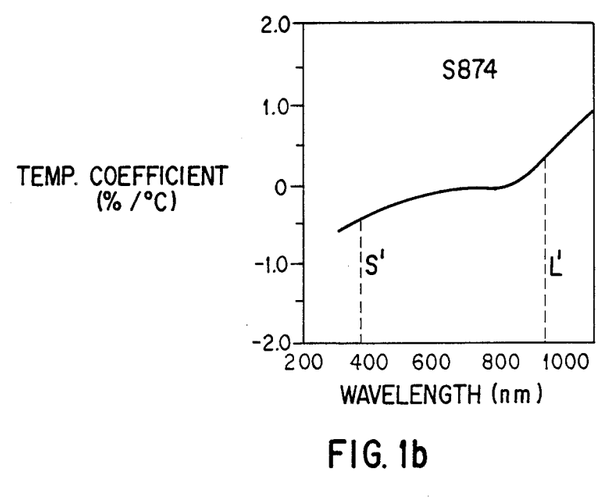

First, the basic principle of a temperature measuring system of this invention is described. Referring now to FIGS. 1a and 1b, it is apparent that the temperature coefficient of photo electric conversion efficiency varies with the values of wavelength of applied light. FIGS. 1a and 1b show characteristic curves for well known Si photodiodes (S1087, S874) respectively. If light with a particular wavelength can be extracted, the trouble, caused by the fact that the temperature coefficient varies with wavelength, can be eliminated.

Thus, two photodiodes A and B having relatively the same characteristics are provided; A is designed only to receive the light with a wavelength S or S' while B is designed only to receive the light with another wavelength L or L'.

Figure 2A:
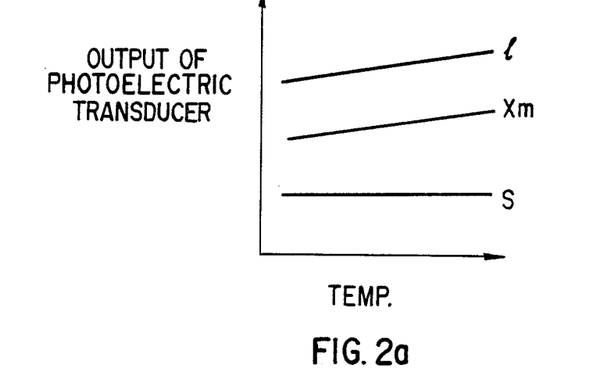
FIGS. 2a and 2b are graphs showing the principle of a temperature measuring device of this invention.
Figure 2B:
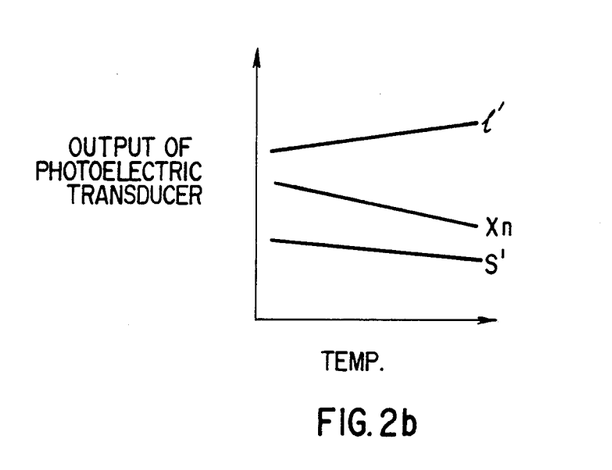

The output S or S' generated from A and l or l' generated from B are used to produce the ratio l/S or l'/S'. Accordingly, the value Xm and Xn shown in FIGS. 2a and 2b are obtained which represent the temperature of the photodiodes A and B or, effectively, the ambient temperature of A and B.

Figure 3:
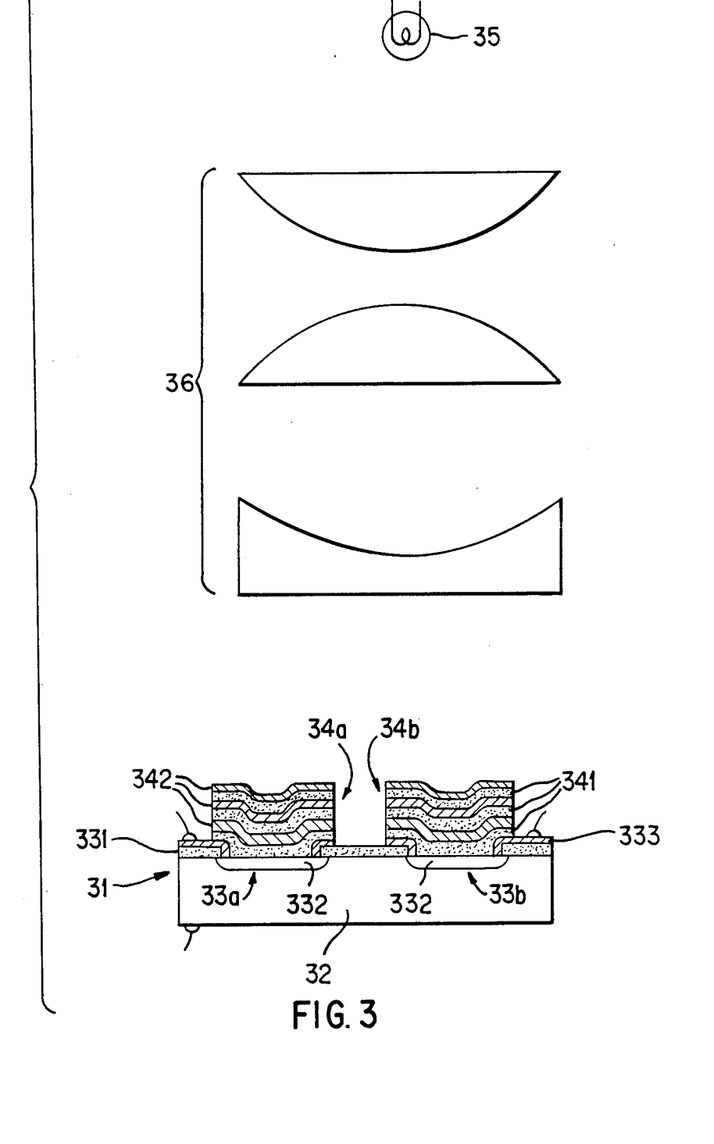
FIG. 3 is a view showing one embodiment of a photoelectric transducer and an optical system which may be used in an embodiment of the invention.

FIG. 3 shows a semiconductor photoelectric transducer which may be used in an embodiment. The transducer 31 has two photodiodes 33a and 33b formed on the surface of a substrate (n-Si) 32, and has interference filters 34a and 34b formed over the photodiodes 33a and 33b respectively.

The photodiode 33a and 33b are formed as follows; the surface of the substrate 32 is covered with an oxide cover layer ($SiO_2$) 331, which is perforated to have an inversion layer ($p^+$-Si) 332 formed over the exposed part of the substrate 32. Then, an electrode (Al) 333 is formed over the oxide cover layer 331. Consequently, the photodiode 33a and 33b are formed to have similar characteristics.

Interference filters 34a and 34b have a silver (Ag) layer 341 and a magnesium fluoride ($Mg\ F_2$) layer 342 formed in this order and in turn over the photodiodes 33a and 33b. The well known interference filters are obtained by changing the thickness of the each layer.

Figure 4:
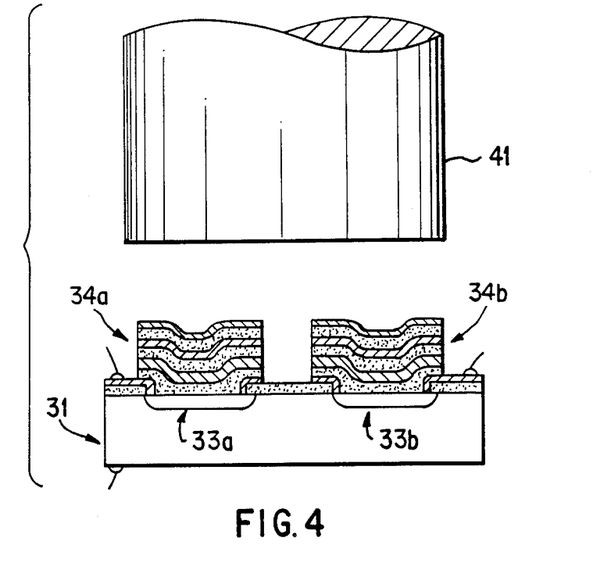
FIG. 4 is a view showing a modification of the optical system employed in FIG. 3.

The photoelectric transducer 31 receives the light from a lamp 35 which emits a stable spectrum of light. The light rays are arranged in parallel through a collimater optical system 36. The collimater optical system may be replaced by an optical fiber 41, as shown in FIG. 4.

Figure 5:
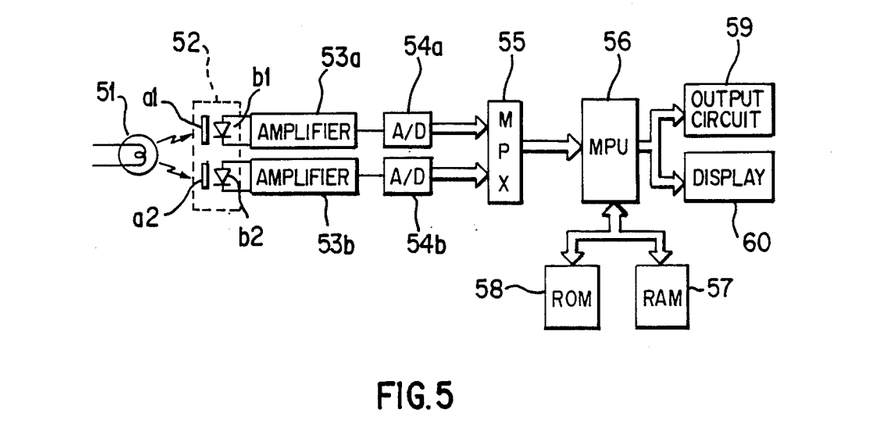
FIG. 5 is an electric circuit diagram showing an embodiment of a temperature measuring device of the invention.

In FIG. 5, the light emitted from the lamp 51 is received at light receiving means 52 which comprises colored filters a1 and a2, and photodiodes b1 and b2. These can be formed as the photoelectric transducer shown in FIG. 3 or can be assembled from separate parts. The photodiodes b1 and b2 receive light at respective wavelengths, as determined by filters a1 and a2, converting it to electric energy which is fed to amplifiers 53a and 53b, where the input energy is amplified up to a certain level. The outputs generated from the amplifiers 53a and 53b are converted to digital values by A/D convertors 54a and 54b, and sent to a multiplexor 55 which selects data and feeds the selected data into a microprocessing unit (MPU) 56.

Figure 6:
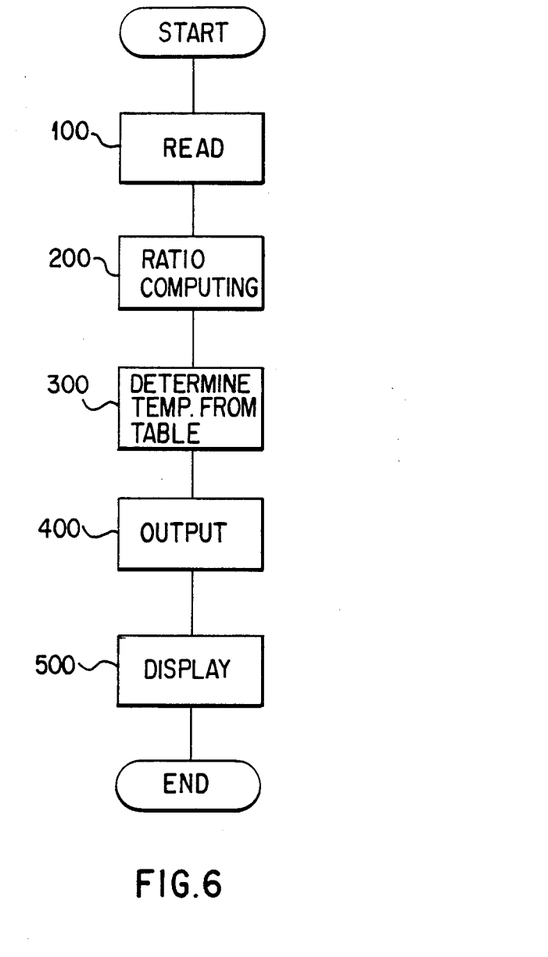
FIG. 6 is a flowchart showing an operation of the FIG. 5 embodiment.

The MPU 56 stores the received data in the corresponding area of RAM 57 as shown in step 100 of FIG. 6. The MPU 56 operates in accordance with the system program stored in ROM 58 in order to compute the ratio of the data which is generated from the A/D converters 54a and 54b, and stored in the RAM 57. In other words, the MPU56 computes the above-described ratio l/S, or l'/S' (step 200).

Subsequently, referring to a temperature table prestored in another area of the RAM57, a temperature corresponding to the ratio produced in step 200 is determined (step 300). Consequently, Xm or Xn shown in FIGS. 2a and 2b is fed into an output circuit 59 (step 400), and temperature corresponding to the value of the ratio is shown at a display 60 (step 500).

Figure 7:
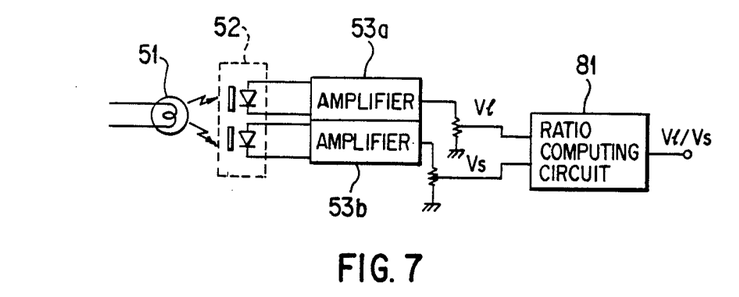
FIG. 7 is an electric circuit diagram showing another embodiment of a temperature measuring device of the invention.

FIG. 7 shows another embodiment of this invention. In this embodiment Ve and Vs, the respective outputs of amplifiers 53a and 53b are directly introduced into a ratio computing circuit 81 from which the ratio Ve/Vs is produced. This embodiment is easier to manufacture compared to the embodiment shown in FIG. 5.

Figure 8:
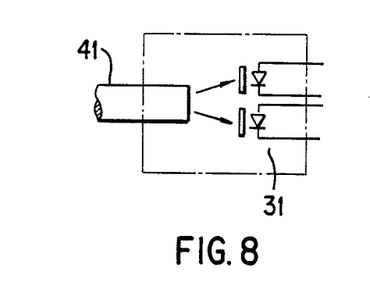
FIG. 8 is a fragmentary view showing another arrangement of light emitting means and light receiving means which may be used in the various embodiments of the invention.

The lamp 51 and the light receiving means 52 may be replaced by the optical fiber 41 and the photoelectric transducer 31 as shown in FIG. 8.

Figure 9A:
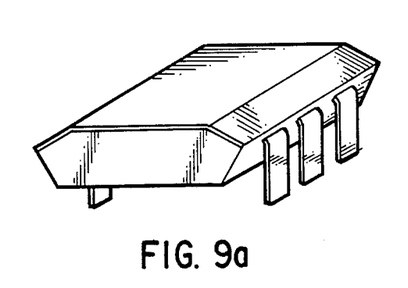
FIG. 9a is a perspective view showing an appearance of the package containing the light emitting means, the photoelectric transducer, and the color filters.

FIG. 9a shows a DIP package which contains light emitting means together with a photoelectric transducer. Inside the DIP package, as shown in FIG. 9b, light emitting diodes 91 and 92 and a photoelectric transducer 31 shown in FIG. 3 are mounted on each electrode in such a manner that they confront each other.

Figure 9B:
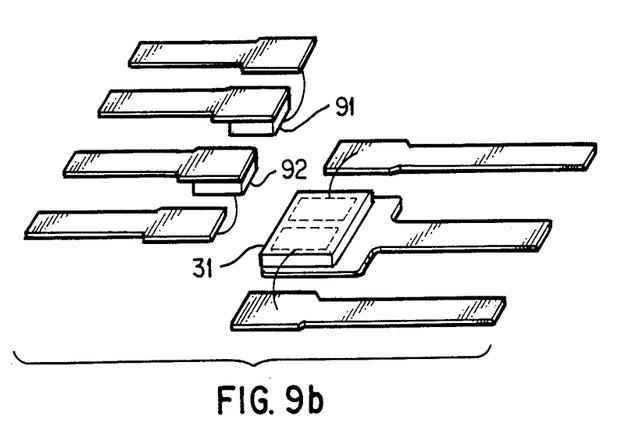
FIG. 9b is also a perspective view showing a parts arrangement inside the package.

The embodiment shown in FIGS. 9a and 9b enables temperature measuring of a substrate by directly inserting the package terminals into a predetermined portion of the substrate.

Referring to FIG. 3, a plurality of light receiving means provided with interference filters the wavelength bands of which are different from each other, are formed on a one-chip semiconductor photoelectric transducer. However, the following modifications may be accepted.
 (1) Conventional colored filters may be employed instead of the interference filters.
 (2) Each light receiving means may be formed on separate chips of semiconductor photoelectric transducer.
 (3) Each light receiving means may have different temperature characteristics.
 (4) Each light receiving means may have different spectral sensitivity characteristics which enable them to sense respective predetermined bands of spectrum, thus eliminating the filters for selecting spectrum components.
 (5) Photo transistors as well as photo diodes may be formed on the semiconductor photoelectric transducer.

Figure 10:
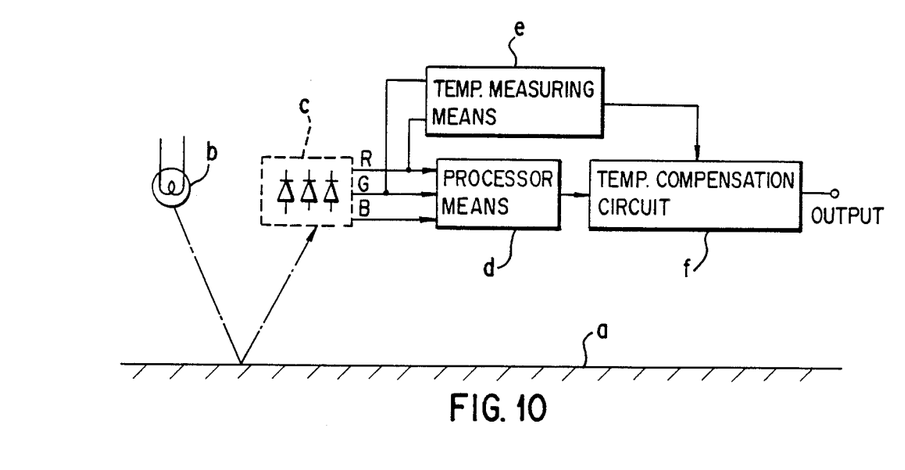
FIG. 10 is an electric circuit diagram showing an application of a temperature measuring device of this invention.

FIG. 10 shows an embodiment of the invention for performing temperature compensation in an optical measurement. The colorfully patterned surface of an object(a) is radiated by a source of light(b). The reflected light emitted from the object(a) is received at light receiving means(c) or color recognition elements which are formed on the surface of a common substrate like the photoelectric transducer 31 shown in FIG. 3. The light entering into each element is transduced into each component value of red(R), green(G), and blue(B). Processor means(d) computes component ratios based on the three outputs R, G, and B and judges the color of the light received at the light receiving means(c), while temperature measuring means(e) computes output ratios based on the two out of the three outputs, entering the computed ratios into a temperature compensation circuit (f). The temperature compensation circuit(f) compensates an output generated from the processor means with respect to temperature by referring to the output ratios from the temperature measuring means (e).

It will be apparent from the above description that the device can compensate the output of light receiving means with respect to temperature by referring to temperature information contained in the output thereof even if the light receiving means is affected with respect to temperature due to reflected light from an object, thus enabling the performance of highly accurate temperature measuring.

What is claimed is:

1. A temperature measuring device comprising:
light emitting means for emitting light having a wavelength spectrum which is constant with respect to time;
photoelectric transducing means for sensing said emitted light at a plurality of predetermined different wavelength regions within said spectrum to generate respective electrical outputs, corresponding to said different regions, at least one of said electrical outputs changing in accordance with temperature changes of said photoelectric transducer means; and,
computing means for computing a ratio base don a pair of electrical outputs generated from said transducing means, and for generating an output signal representing a temperature value of one of (i) said photoelectric transducing means and (ii) the ambient of said photoelectric transducing means, corresponding to said ratio.

2. A temperature measuring device as in claim 1 wherein said photoelectric transducing means has an optical filter thereon for producing said different wavelength regions.

3. A temperature measuring device as in claim 2 wherein said optical filter is an interference filter.

4. A temperature measuring device as in claim 2 or claim 3 wherein said photoelectric transducer means is a semiconductor photoelectric transducer means and said optical filter is formed as part of an integrated structure which includes said semiconductor photoelectric transducer means.

5. A temperature measuring device comprising:

light emitting means for emitting light having a wavelength spectrum which is constant with respect to time;

a plurality of photoelectric transducers, placed in the same ambience, each having a temperature coefficient of photoelectric conversion efficiency which is variable in accordance with the wavelength of the light received thereby, each of said transducers generating a respective electrical output, at least one of said electrical outputs changing in accordance with temperature changes of said photoelectric transducing means;

optical filter means for extracting from the light emitted from said emitting means a plurality of different spectrums and for respectively introducing said extracted spectrums into said photoelectric transducers; and computing means for computing a ratio based on a pair of electrical outputs generated from said transducers and for generating an output signal representing a temperature value of one of (i) said photoelectric transducers and (ii) the ambient of said photoelectric transducing means, corresponding to said ratio.

6. A temperature measuring device comprising:

light emitting means for emitting light having a wavelength spectrum which is constant with respect to time, optical filter means for extracting from the light emitted from said emitting means a plurality of different spectrums;

photoelectric transducing means having a plurality of light receiving areas for respectively receiving the spectrums passing through the optical filter means and generating different outputs in accordance with the respective spectrums, at least one of said electrical outputs changing in accordance with temperature changes of said photoelectric transducer means, and computing means for computing a ratio base don a pair of the outputs generated from said transducing means and for generating output signals representing a temperature value of one of (i) said photoelectric transducing means and (ii) the ambient of said photoelectric transducing means, corresponding to said ratio.

7. A temperature measuring device as defined in claim 6 wherein said photoelectric transducing means comprises a one-chip photodiode having a plurality of light receiving areas thereon.

8. A temperature measuring device as defined in claim 5 or in claim 6 wherein said optical filter means comprises a plurality of interference filters the spectral sensitivities of which are different from each other.

9. A temperature measuring device as defined in claim 6 wherein the light emitting means, the photoelectric transducing means, and the optical filter means are accommodated in a common housing.

10. A temperature measuring device as defined in claim 6 wherein said light emitting means includes a light emitting end of an optical fiber.

11. A temperature measuring device as defined in claim 6 wherein said outputs generated from the transducing means are compensated with respect to temperature by said output signals generated from the computing means.

12. A temperature measuring device comprising:

light emitting means for emitting light having a spectrum which is constant with respect to time;

photoelectric transducing means for sensing a predetermined wavelength of said emitted light and generating an electric output, said output changing in accordance with temperature changes of said transducing means; and, computing means for computing a temperature of one of (i) said photoelectric transducing means and (ii) the ambient of said photoelectric transducing means, based on said electric output.

13. A temperature measuring device as in claim 12 wherein said photoelectric transducing means has an optical filter thereon for producing said predetermined wavelength regions.

14. A temperature measuring device as in claim 13 wherein said optical filter is an interference filter.

15. A temperature measuring device as in claim 13 or claim 14 wherein said photoelectric transducer means is a semiconductor photoelectric transducer means and said optical filter is formed as part of an integrated structure which includes said semiconductor photoelectric transducer means.

* * * * *